Sept. 23, 1969    H. MÜLLER    3,468,196
DRILLING HEAD MOVABLE HORIZONTALLY AND VERTICALLY
Filed Nov. 30, 1966    2 Sheets-Sheet 1

INVENTOR
HELLMUT MÜLLER

BY Bailey, Stephens & Huettig
ATTORNEY

Sept. 23, 1969   H. MÜLLER   3,468,196
DRILLING HEAD MOVABLE HORIZONTALLY AND VERTICALLY
Filed Nov. 30, 1966   2 Sheets-Sheet 2
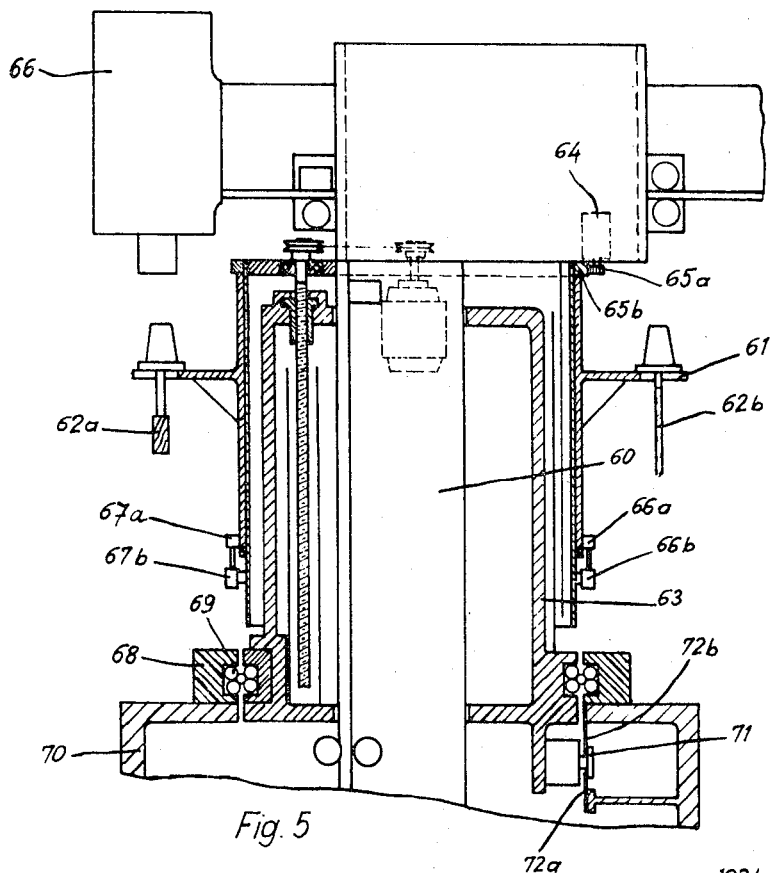
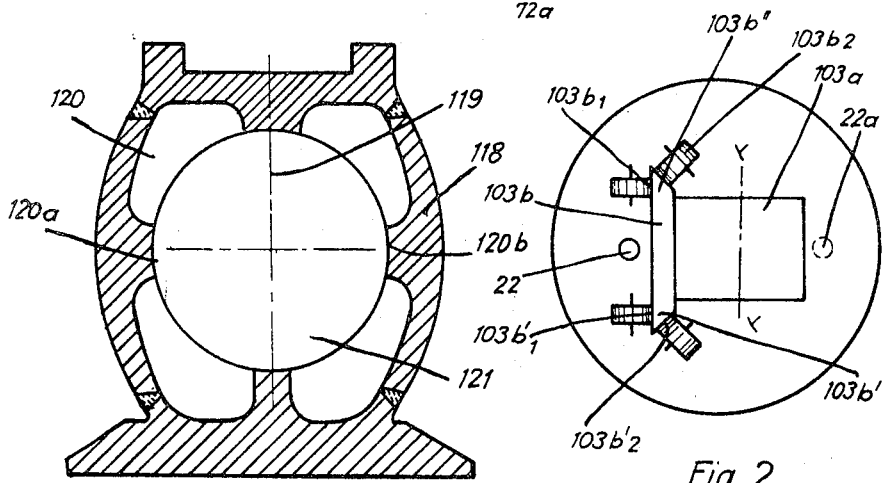
INVENTOR
HELLMUT MÜLLER
BY Bailey, Stephens & Huettig
ATTORNEY

United States Patent Office 3,468,196
Patented Sept. 23, 1969

3,468,196
DRILLING HEAD MOVABLE HORIZONTALLY AND VERTICALLY
Hellmut Müller, 91 Esslinger Str., 731 Plochingen (Neckar), Germany
Filed Nov. 30, 1966, Ser. No. 597,923
Claims priority, application Germany, Dec. 1, 1965, M 67,482
Int. Cl. B23b 39/12, 47/26
U.S. Cl. 77—28                                    25 Claims

ABSTRACT OF THE DISCLOSURE

A drilling machine has an under-frame, a turning carriage mounted in the under-frame to turn about a vertical axis, a column vertically slidable in the turning carriage, and a beam carrying a drilling tool horizontally slidable in the top of the column with the tool at one side of the column. The column is hollow and of substantially rectangular cross-section with the longer axis extending in the direction of the projection of the beam. The column has at least three plane guide surfaces engaged by rollers on the column.

BACKGROUND OF THE INVENTION

Field of the invention

The invention has the aim of providing a machine of the nature of a radial drilling machine in which either the column is supported on the under-frame construction so as to be movable up and down and carries on its upper end the beam with the spindle head or the beam is supported on the column or a turning frame so as to be movable up and down.

SUMMARY OF THE INVENTION

The invention has the aim to of providing machine of the above said type which is characterized by a minimum of weight combined with a maximum of bending and torsional resistance and in which all movements may be performed as easily as possible and almost free from friction, whereby a high precision for a long time and without wear is ensured, it being also possible to use said machine practically universally, that is in connection with automatic sequences of operation and with all possible kinds of under-frame constructions.

To realize all this, according to the invention the substantially hollow column is supported on the under-frame construction so as to be movable up and down and carries on its upper end the beam with the spindle head, or the beam is supported on the column or a turning frame so as to be movable up and down, wherein the substantially hollow column has a cross-section with the shape of a polygon the longer axis of which extends in the direction of the bending forces, there being provided on the circumference or periphery of the column at least three plane guide face sections extending in the longitudinal direction of the said column, to which there are allotted at least three antifriction bearing elements, for example, guide rolls on the counter element cooperating with the column in order to provide for a reliable guidance during the up and down movement, each of said bearing elements bearing on a guide face section allotted thereto so as to roll therealong. With the arrangement according to the invention the hollowness of the column and the form of its profile make it possible to combine a minimum of weight with a maximum of bend and torsional resistance, whereas the non-circular cross section of the column prevents a rotation of the column during the up and down movements from taking place. Moreover, the mounting is such that the friction taking place during this movement is reduced to the inevitable minimum, in addition, the manufacture of the individual parts may be simplified and standardized especially if the forms and dimensions of the cross sections of the parts of the column or the turning frame participating in the guiding and of the beam or—eventually—of the guiding elements for the column and the beam movable to and fro or up and down, and of the slide for the spindle head are equal. Last but not least the new arrangement presents a maximum of long-term precision without wear.

Moreover, it is desirable that the new drilling machine with the colum carrying the beam or the guide box be provided with a turning frame that is insertable between the column and the under-frame construction and can be assembled with the column to form an independent constructional unit working for itself and containing eventually all the means, features and elements which are necessary to produce either the up and down movements of the column or beam or the to and fro movements of the beam or the spindle head, and also the means to block and lock the parts in motion in their respective positions. The turning frame in question is supported with its lower part on an under-frame construction standing vertically up from its mounting so as to take up the bending and torsional loads, the column being mounted thereon so as not to be rotatable in relation therewith. The advantage of such an arrangement is evident: it is qualified by its solidity and its high resistance and by the low manufacturing costs, for the individual units can be built and used for themselves. So it can be used, for instance, for any under-frame construction with a finished face for the screw connection. The turning frame, too, is in a position, together with the column belonging to it, to work for itself and to be used in connection with under-frame constructions of any kind. So it can be coordinated, for instance, with a given under-frame construction in such a way that it is either rotatable on the frame or rigidly attached to it. Moreover it can be so arranged as to be displaceable along a table or on rails. This universality results from the vertical extension of the turning frame, since this makes it possible to locate within the construction in question all the elements which are necessary to produce the different movements. On the other hand in this way a torsional strength that is remarkable can be obtained, whereas the resistance against bending can be improved by the profile chosen for the column and/or the beam. Nevertheless, the constructive elements within the frame are easily accessible from the outside. The turning frame may extend from the under-frame construction high enough to obtain a long and excellent guidance, whereby an ingenious simple general arrangement makes is possible, moreover, to protect the column and its guiding face sections against damage and dirt accumulation. This arrangement facilitates also the compensation of the weight as well as the lubrication.

BRIEF DESCRIPTION OF THE DRAWINGS

These and other objects, features, and advantages of the present invention will become further apparent from the following detailed description thereof, particularly when the same is read with reference to the accompanying drawings which show several embodiments of the invention and in which—

FIG. 2 is a section of FIG. 1 taken along the line I—I in FIG. 1.

FIG. 4 is a vertical section of the beam of a further modified embodiment of the invention, and FIG. 5 is a partly sectional and diagrammatic side view of another variation of a drilling machine in accordance with the invention.

DESCRIPTION OF THE PREFERRED EMBODIMENTS

Figures 1, 3:
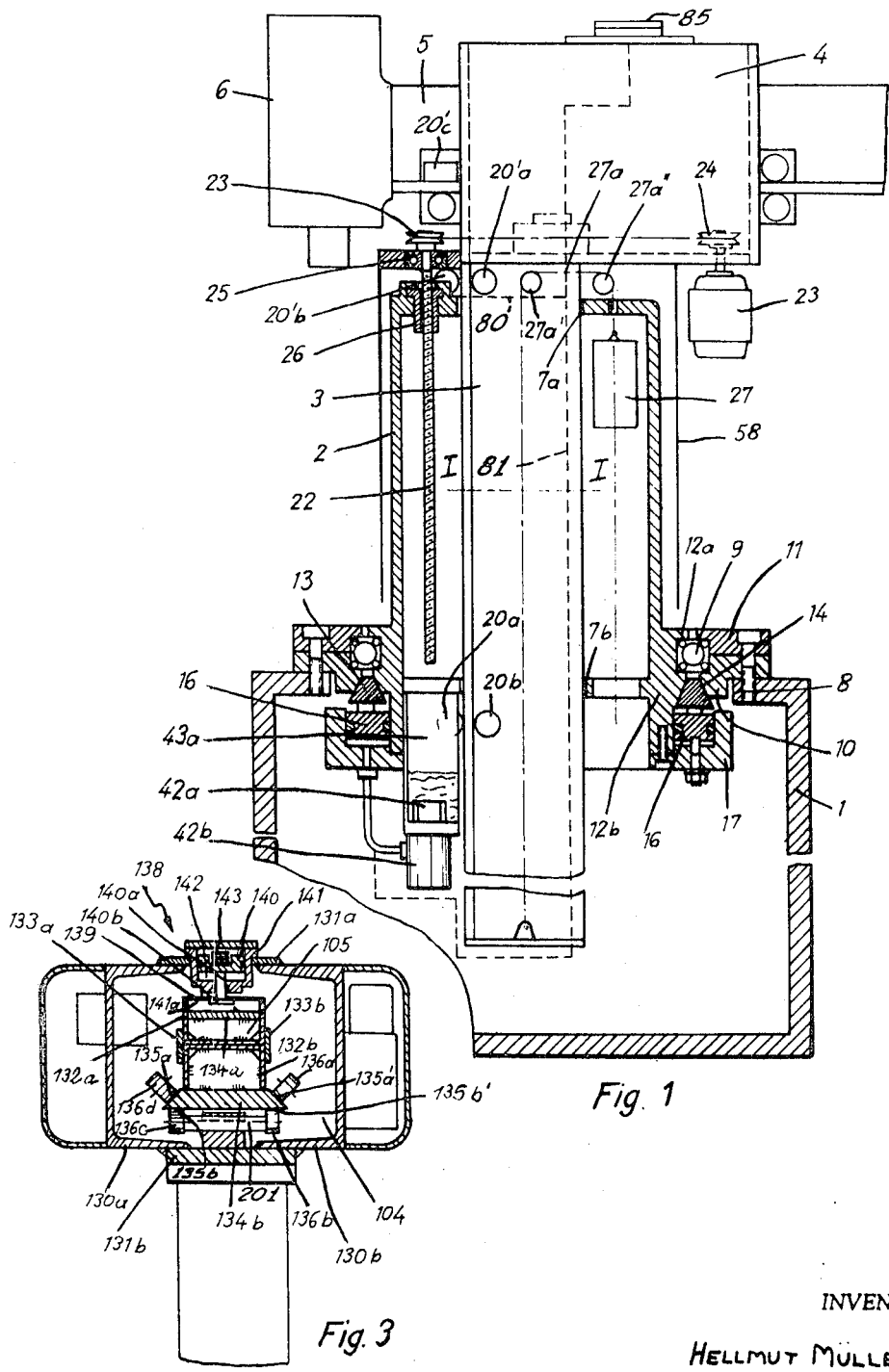
FIG. 1 is a partly sectional and diagrammatical side view of a drilling machine in accordance with the invention working in the manner of a radial drilling machine.
FIG. 3 is a vertical section of the guide box and the beam of a modified embodiment of the invention.

The arrangement shown in FIG. 1 is an example of a drilling machine working in the manner of a radial drilling machine. The most important parts of it are the under-frame construction 1, the turning frame 2, the column 3, the guide box 4, the beam 5, that can be displaced to and fro, and the spindle head 6 on the beam 5. As with all known arrangements of the type in question, the spindle head is carried by the beam, and the beam is connected with the column by means of the guide box so as to be displaceable to and fro, said column serving as a vertical guiding element for the relative vertical displacement between the spindle head and the work piece support. In accordance with the invention, the turning frame 2 is interposed between the column 4 and the under-frame construction 1, whereby it is assembled with the column to form an independent constructional unit working for itself. The turning frame 2 has the form of a hollow cylinder, the two front faces of which have openings 7a and 7b for the column to pass through. In the zone of its lower end the turning frame is supported on the under-frame construction by having its lower end accommodated into a cut-out 8 of the under-frame construction 1 and rotatably mounted on the wall portion surrounding the cut-out by means of a ball bearing pivotal mounting. The frame extends vertically upwards from the support or mounting place. The balls 9 of this ball bearing pivotal mounting are located and contained between on the one side a lower ring 10 inserted into the cut-out of the under-frame construction and affixed thereto by means of screws, and on the other side an upper ring 11 resting on the lower ring and conveniently connected therewith by means of screws and, finally, two flanges 12a, 12b on the inner side opposite to the said two rings in the zone of the lower end of the outer periphery of the turning frame. To block and lock the turning frame in any position required it is suitable to provide clamping elements which may be actuated hydraulically or pneumatically or electromagnetically or mechanically, and which conveniently engage, when actuated, the lower face of the turning frame as well as of the under-frame construction, thus clamping these two parts together, and securing these parts against each other. The clamping elements of the embodiments shown in the drawings have the shape of ring-like segments 13 which in cross section have a frusto-conical shape tapering in the vertical direction and which engage in a corresponding cut-out 14 between the turning frame and the under-frame construction on the underside thereof and which is formed by chamfering the lower edges of the said two parts lying opposite to each other. The clamping elements may also be arranged on the upper ends of vertically displaceable bolts, whereby an exact centering and adjustment as well as a positive and reliable contact of these clamping elements with the conical zone 14 is obtained. The embodiment shown in FIG. 1 presents the clamping elements in connection with a piston 16 which is guided so as to be movable up and down within an hydraulic working cylinder 17 and which stands on the one hand under the pressure of the hydraulic medium and on the other hand under the action of a spring. The pistons and cylinders may be designed as annular pistons or cylinders, but it is also possible to provide several pistons and cylinders extending each over a ring segment so as to be disposed around a circle. If in the space on the lower side of the piston there is introduced a hydraulic pressure medium, then the piston moves upwards, whereby the ring segments are pressed into the corresponding cavities, and the turning frame is clamped to the under-frame construction. The clamping elements and the bolts carrying them may also be provided on the upper side of an upper pressure plate carrying them and movable up and down with clearance along the turning frame and which is, in connection with a second lower pressure plate, affixed to the turning frame by means of an elastic and extensible element such as an element having walls formed like accordion walls or such as a rubber tube the interior of which is in connection with a feeding device for feeding a hydraulic or pneumatic medium.

If no ball bearing pivotal mounting is provided between the turning frame and the under-frame construction, the turning frame may be solidly and fixedly connected with the under-frame construction in the manner of a column guide frame or a so called press tool die set so that the column can be moved up and down, and the beam can be displaced to and fro, but the pivotal or turning movement is eliminated. According to FIG. 5, it is also possible to displace the under-frame construction on a table in direction therealong or on rails that conveniently extend transverse to the axis of the beam, so that longer parts, chassis for instance, can be machined. In this case—when working along coordinates—an exact positioning would also be possible.

As can be seen from the different figures of the drawings, on the outer periphery of the column there are provided at least three plane guide face portions extending in the longitudinal direction of the column and lying opposite to one another, said guide face portions consisting of hardened surface portions or of hard steel ledges or strips. On the counter part cooperating with the column, for example, the turning frame, there are provided at least three guide means, for example, guide rolls each of which bears against a surface portion allotted thereto and associated therewith. As for the cross-section of the column, it can be a rectangle or a square with or without lateral guiding projections, or a rhombus or even a form with two corners only. To guide the said column, guiding rolls which may be adjusted by means of eccentric devices are coordinated and associated with the said guide face sections, for example, three rolls or two or four pairs of rolls, the arrangement being such that each guiding roll bears from the outside against the guide face section coordinated thereto and rolls therealong. As for the beam, it may be guided and displaced by using the same arrangement.

It can be seen from the drawings that with profiles which have two or four corners (squares, rhombs, rectangles) it is recommendable to make the arrangement such that the longer axis extends in the direction of the bending forces. The result is a stiffness especially favorable and high. The hollow profile form 118 shown in FIG. 4 has an outer periphery generally similar to that of a rectangle with its longitudinal symmetry axis 119 extending vertically, whereas the hollow space 120 is so shaped that corresponding suitable guide projections or noses 120a, 120b can take up bodies with circular cross section, motors 121 for instance. The form of the circumference or outer periphery and the shape of the bore of the hollow profile result in an increased bending resistance and a particularly favorable torsional strength. The embodiment presented in FIG. 4 is made by using heat extrusion moulding, but the column and/or the beam may be assembled also of several profiled parts interconnected by welding. The column shown in FIG. 2 is composed of two portions 103a, 103b extending in the longitudinal direction of the column of which the main part 103a has a rectangular cross section, whereas the guiding part 103b is provided with ends 103b' and 103b" projecting beyond the main part which are provided each with flat guide face sections $103b_1$, and $103b_2$ or $103b'_1$, and $103b'_2$, coordinated in pairs to each other and arranged so as to enclose acute angles between them, such that the direction of the maximal load coincides with the direction of the maximal extension of the cross-section. For supporting the column there are provided—just as with the beam—two groups of bearing elements 20a, 20b or 20'a, 20'b; spaced apart in axial direction and thereby lying one above the other, said bearing elements being mounted on the turning frame so as to be rotatable about horizontal axes, said bearing elements being constructed as antifriction bearings, and preferably as rolls. In order to obtain a guidance without clearance, the said bearing elements are arranged so as to be adjustable, as by mounting a pin 201 turnably in a hole, the axes of the rollers being eccentrically positioned in the ends of the pin. At least one of the pair of bearing elements such as 20'c loaded by the drilling pressure may be suitably constituted by an adjustable slide bearing block which offers a better mounting with a static support.

The up and down movement of the column is produced by a threaded spindle 22 with a longitudinal axis that rises vertically. On the one hand, this spindle is at its upper end in connection with the driving gear 23 from which it receives a rotational movement by means of the belt or chain transmission 24, which, if desired, may be constructed in the manner of a pivotable gear. On the other hand, the said spindle 22 is supported on the column or on a part connected with said column at 25 so as to be rotatable but not displaceable in the axial direction and which passes through a threaded nut 26, that is either adjustable or made of two pieces and is arranged on the turning frame, heat insulation material being interposed to avoid undesired heating. The remaining part of the spindle is accommodated within the turning frame. Excessive tilting moments will not show up, if the spindle is mounted on that side of the column where the rolls are applied (FIG. 2). However, the spindle in question may be arranged on that side of the column which is opposite to the said antifriction bearing elements, if the pressure on the block of the slide bearing is reduced, as indicated by dotted lines at 22a in FIG. 2. However, in lieu of the threaded spindle there may be used for producing the up and down movement of the column hydraulic or pneumatic driving aggregates of conventional type. To the column there may be allotted also the counter weight 27 serving to reduce the load during the upward movement and which is connected with the said column by means of a belt or rope 27a which is attached on its one end to the said column and on its other end to the said counterbalance and which is drawn or laid round the return pulleys 27a', 27a''. Also a spring or a pneumatic device can serve to compensate the weight of the column. The guide box 104, directly connected with the column, for example, by screws or shrunk parts or the like, consists according to FIG. 3 of two steel portions 130a, 130b, which have U-like profiles, are welded together and are stiffened on their upper and lower sides by the flat irons 131a, 131b and on the frontal sides by front plates, the said flat irons and front plates being welded to the respective parts of the said guide box. The stiffness and rigidity of the guide box is remarkably increased by giving it a rectangular cross-section. The manufacturing costs are low, because, in addition to their normal boring and tapping operations, the two flat irons and the front sides must be planed only. The beam 105 (FIG. 3) consists in its turn of two U-like profiles 132a, 132b edged and laid back to back and connected with one another by the flat parts 133a, 133b which are welded on them and extend laterally in the longitudinal direction of the beam. The beam is stiffened on its upper side by a reinforcing plate 134a put between the vertical legs of the upper U-like profile, and on its lower side it is stiffened by the guiding plate 134b which is welded thereto and which is engaged by the rolls of the guide box. The ends of the guiding plate project on both sides of the beam and are provided with flat guide face sections 135a, 135b, or 135a' and 135b', which enclose between them an acute angle, and which are engaged by the rolls 136a, 136b, 136c, 136d. In the embodiments shown in the drawings the column is constructed in the same manner. To block and lock the beams in their respective positions, a hydraulic aggregate consisting of a cylinder and a piston is arranged below the beam, the piston rod of which engages the said beam from below, thus clamping the beam. FIG. 3 presents a variation, where the beam 105 is blocked and locked in its position by the aggregate 138 comprising a cylinder and a piston arranged above the said beam and operated hydraulically or pneumatically. On the upper side of the said beam there are fixedly arranged clamping plates 139 pierced by the rod 140a of the piston 140. These plates can be clamped between the collar 140b on the piston rod engaging the clamping plates from below, and a bearing surface 141a of the cylinder 141. The beam is blocked as soon as pressure is built up in the space 142. The spring 143 helps to undo and loosen the blockage again. Friction during the movement is avoided, if the clamping plates or the cylinder are elastically and movably suspended. It is possible to provide this variation on the lower side of the beam.

The pressure necessary for the blocking of the arm as well as of the column can be produced by a common gear pump 42a which is actuated by the motor 42b and which may be arranged either on the lower side of the turning frame or on the guide box. In both cases the said pump is connected with at least one clamping aggregate by means of hose pipes. To feed the pump there is provided an oil bath 43a situated above the said pump 42a and below the threaded spindle 22 and serving at the same time to receive oil dripping from the spindle. The hose pipes are unnecessary, if gear pumps are mounted on the under side of the turning frame as well as on the guide box.

The light construction chosen for the beam helps to reduce the weight and to obtain an easy running with a stiffness and rigidity of high grades.

The column or the turning frame are covered on their outside by iron sheets overlapping each other and telescopically extensible. One sheet is suspended on the lower or underside of the guide box, whereas the other sheet rises from the upper side of the under-frame construction or of the turning frame. Instead of these two sheets a single sheet 58 may be used. Thus, provision is made for a good portection against dirt accumulation and other influences, for example, mechanical influences that might lead to damage.

The whole guiding aggregate in the guiding case is protected from dust, the free part being made dustproof by means of a accordion walls arrangement. Rings arranged telescopically may be used instead of the said accordion walls arrangement. In order to simplify the construction and standardize the manufacture, all parts participating in the guidance of the column or of the turning frame and beam may have a cross-section of the same shape. It is moreover possible to give the same shape to the guiding elements for the column and the beam allotted thereto and movable to and fro with the column going up and down, or for the beam and the slide of the spindle head with the beam going up and down. Also the shape of the cross sections of the column (or of the turning frame) and of the beam or the guiding elements for the column and for the beam movable to and fro or for the beam movable up and down and for the slide of the spindle head may be the same and have the same dimensions.

The embodiment presented in FIG. 5 shows a magazine for tools 61, allotted to the column 60, and which has the shape of a ring surrounding the column and contains several tools 62a, 62b which are to be picked up by the tool holder 66 in the usual way and in a known manner in the course of a program that develops automatically. The rotating adjusting motion round the column 60 and the frame 63 is produced by means of the motor 64 via the toothed wheels 65a and 65b. The magazine for the tools is controlled with the help of the cams 66a, 66b etc. and of corresponding limit switches 67a, 67b. In this case the frame is supported by means of so-called guiding devices 69 of the Dexter-type on ledges 68 or bands or rails put on the under-frame construction 70 so as to be displaceable in their longitudinal direction. The clamping or blockage is effected by means of the piston 71 with the help of the iron sheets 72a and 72b.

Automatic lubrication is provided by a pipe 81 leading from pump 42b and side pipes such as 80 leading to the area of the nuts 20b. Pipe 80 also supplies fluid under pressure to the clamping means 85 for the beam, so that the beam and the turning frame are both locked when the pump 42b is energized.

Although my invention has been illustrated and described with reference to the preferred embodiments thereof, I wish to have it understood that it is in no way limited to the details of such embodiments, but is capable of numerous modifications within the scope of the appended claims.

Having thus fully described my invention, what I claim is:

1. Radial drilling machine which comprises an under-frame part, a column part and a beam part, a drilling tool carried by the beam part at one side of the column part, cooperating means on said parts mounting the beam part for up and down movement with respect to the under-frame part, including means mounting the column part for relative movement with respect to one of the under-frame and beam parts, said column being substantially hollow and having a substantially polygonal cross-section with its greater dimension extending in the direction of the projection of the beam part from the column part, said mounting means including at least three plane guide face sections on one of the relatively movable parts extending in the direction of relative movement between the parts, and antifriction means on the other of the relatively movable parts engaging said guide face sections.

2. The drilling machine set forth in claim 1, wherein said guide face sections are on the column and the portions of the said column carrying said guide face sections and the said beam have cross-sections with the same shape.

3. The drilling machine set forth in claim 1, wherein the outer periphery of the hollow column has two convexly curved sides, and has a through bore with shoulders to receive between them objects having cross sections that are substantially circular.

4. The drilling machine set forth in claim 1, wherein one of the column and beam parts comprises two portions lying flat against each other and extending in the longitudinal direction of said part, said portions including a main portion having a substantially rectangular cross-section and a guide portion the ends of which guide portion project from the main portion on opposite sides thereof and present said plane guide face sections which are arranged in pairs enclosing between them an acute angle.

5. The drilling machine set forth in claim 1, wherein a guide box is directly connected with the column, said guide box having a rectangular cross section and comprising two parts which have U-like profiles and are welded together, and being reinforced on the upper and lower sides by flat irons and on the front sides by sheets, said beam being horizontally slidable in said guide box.

6. The drilling machine set forth in claim 1, wherein a turning frame is mounted in the under-frame for turning about a vertical axis, and the column part is mounted for vertical movement with respect to the turning frame, and said antifriction means comprise two groups of bearing elements each group comprising a pair of bearing elements arranged on the said turning frame and which lie at some distance from one another in the axial direction, and one above the other, said bearing elements being constructed as rolls rotating about horizontal axes.

7. The drilling machine set forth in claim 1, wherein a turning frame is mounted in the under-frame for turning about a vertical axis, and the column part is mounted for vertical movement with respect to the turning frame, and said antifriction means comprise two groups of bearing elements each group comprising a pair of bearing elements arranged on the said turning frame and which groups lie at some distance from one another and behind one another in the axial direction, the bearing elements of the one group comprising rolls, whereas at least one of the bearing elements of the other group loaded by the boring pressure comprises a slide bearing block.

8. The drilling machine set forth in claim 1, wherein a turning frame part is mounted in the underframe part for turning about a vertical axis, and the column part is mounted for vertical movement with respect to the turning frame part, the above said parts being assembled together to form a unit, said unit containing means for producing the up and down movements of the column and the beam and means for locking and clamping the beam, and wherein the said turning frame part is supported with its lower end on said under-frame part and stands up from its bearing place vertically so as to receive the bending and twisting moments, the said column being non-rotatably mounted on the said turning frame part.

9. The drilling machine set forth in claim 8, wherein the lower end of the said turning frame part is set into a corresponding cavity in the under-frame part and is rotatably supported by means of a ball bearing pivot joint on the part of the wall of the under frame part that surrounds the cavity.

10. The drilling machine set forth in claim 8, wherein the lower end of the turning frame is set on the under-frame construction so as not to be rotatable.

11. The drilling machine set forth in claim 9, wherein for locking and blocking the turning frame part in its respective positions there are provided clamping elements, which serve to interlock the turning frame part and the said under-frame part, and which engage the lower side of the turning frame parts as well as of the under-frame part.

12. The drilling machine set forth in claim 11, wherein means are provided mounting the beam part for horizontal movement with respect to the column part and wherein for locking and blocking the beam part in its respective positions clamping elements are provided cooperating with the beam and column parts which are actuated by the same means as are the clamping elements for the said turning frame.

13. The drilling machine set forth in claim 1, wherein means are provided mounting the beam part for horizontal movement with respect to the column part and wherein for locking and blocking the beam in its respective positions a fluid pressure aggregate comprising a cylinder and a piston is provided on said column part and wherein to the said beam part clamping sheets are attached through which the piston of the said aggregate passes and which can be clamped between a collar on the said piston and a corresponding bearing face on the said cylinder.

14. The drilling machine set forth in claim 1, wherein at least one of the column and the beam parts is manufactured by means of heat extrusion moulding.

15. The drilling machine set forth in claim 1, wherein the antifriction means can be adjusted with respect to the said guide face sections.

16. The drilling machine set forth in claim 1, wherein said column part carries a magazine for tools surrounding the column in ring-like manner, said magazine containing a certain number of tools to be picked up by the tool holder, and the rotational adjusting movement of which around the vertical axis of the column is produced by a separate driving aggregate.

17. The drilling machine set forth in claim 1, wherein the column part is mounted for vertical movement with respect to the under-frame part, and a threaded spindle and nut produce such movement, and wherein automatic lubrication is provided for the threaded spindle and its nut, the spindle being immersed in an oil bath and the said lubrication being fed by the hydraulic motor that actuates the clamping elements.

18. Radial drilling machine as claimed in claim 1, in which said antifriction means are rollers.

19. The drilling machine set forth in claim 1, wherein a turning frame is mounted in the under-frame for turning about a vertical axis, and the column part is mounted for vertical movement with respect to the turning frame, and said antifriction means comprise two groups of bearing elements each group comprising a pair of bearing elements arranged on the said turning frame and which groups lie at some distance from one another and behind one another in the axial direction, at least one of the bearing elements of the group loaded by the boring pressure comprising a slide bearing block.

20. The drilling machine set forth in claim 1, wherein a frame part is mounted in the under-frame part for horizontal movement, and the column part is mounted for vertical movement with respect to the frame part, the above said parts being assembled together to form a unit said unit containing means for producing the up and down movements of the column and the beam and means locking and clamping the beam, and wherein the said frame part is supported with its lower end on said under-frame part and stands up from its bearing place vertically so as to receive the bending and twisting moments, the said column being nonrotatably mounted on the said frame part.

21. The drilling machine set forth in claim 20, wherein the lower end of the frame is set nonrotatably on the under-frame part.

22. The drilling machine set forth in claim 20 in which the frame part is turnable with respect to the under-frame part.

23. The drilling machine set forth in claim 20, wherein the lower end of the frame is supported so as to be displaceable to and from in both directions transverse to the longitudinal axis of the beam.

24. The drilling machine set forth in claim 20, wherein for locking and blocking the frame part in its respective positions there are provided clamping elements, which serve to interlock the frame part and the said under-frame part, and which engage the lower side of the frame part as well as of the under-frame part.

25. The drilling machine set forth in claim 24, wherein means are provided mounting the beam part for horizontal movement with respect to the column part and wherein for locking and blocking the beam part in its respective positions clamping elements are provided cooperating with the beam and column parts which are actuated by the same means as are the clamping elements for the said frame.

References Cited

UNITED STATES PATENTS 2,874,596    2/1959    Witzig _____ 77—28

FOREIGN PATENTS 701,771    12/1953    Great Britain.

FRANCIS S. HUSAR, Primary Examiner

U.S. Cl. X.R.

29—26; 77—4; 90—11; 143—6; 144—134